(12) United States Patent
Ogawa et al.

(10) Patent No.: US 8,784,261 B2
(45) Date of Patent: Jul. 22, 2014

(54) CONTINUOUSLY VARIABLE TRANSMISSION

(75) Inventors: Hiroyuki Ogawa, Susono (JP); Akira Murakami, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 127 days.

(21) Appl. No.: 13/513,414

(22) PCT Filed: Dec. 2, 2009

(86) PCT No.: PCT/JP2009/006565
§ 371 (c)(1),
(2), (4) Date: Jun. 1, 2012

(87) PCT Pub. No.: WO2011/067812
PCT Pub. Date: Jun. 9, 2011

(65) Prior Publication Data
US 2012/0244990 A1    Sep. 27, 2012

(51) Int. Cl.
*F16H 15/52* (2006.01)
(52) U.S. Cl.
USPC .............................. 476/38; 475/161; 475/189
(58) Field of Classification Search
USPC ............................ 476/8, 10, 38; 475/161, 189
See application file for complete search history.

(56) References Cited

U.S. PATENT DOCUMENTS

| 5,236,403 | A | * | 8/1993 | Schievelbusch | ................ 476/38 |
| 5,397,279 | A | * | 3/1995 | McCotter, Jr. | ................ 475/196 |
| 6,682,457 | B1 | | 1/2004 | Yoshida et al. | |
| 7,029,418 | B2 | * | 4/2006 | Taketsuna et al. | ................ 476/8 |
| 2012/0025644 | A1 | | 2/2012 | Ogawa et al. | |

FOREIGN PATENT DOCUMENTS

| JP | 2001 132808 | 5/2001 |
| JP | 2004 52929 | 2/2004 |
| JP | 2007 195320 | 8/2007 |
| JP | 2008 75878 | 4/2008 |
| WO | 2010 122634 | 10/2010 |

OTHER PUBLICATIONS

International Search Report Issued Mar. 9, 2010 in PCT/JP09/06565 Filed Dec. 2, 2009.

\* cited by examiner

*Primary Examiner* — William C Joyce
(74) *Attorney, Agent, or Firm* — Oblon, Spivak, McClelland, Maier & Neustadt, L.L.P.

(57) ABSTRACT

A continuously variable transmission includes a continuously variable transmission mechanism that includes an input disk, an output disk, and planetary balls sandwiched between them and that steplessly changes a transmission ratio between the input disk and the output disk by tilting the planetary balls, wherein cooling performance of a cooling device for the continuously variable transmission mechanism is enhanced as the transmission ratio becomes larger than 1 or smaller than 1.

10 Claims, 7 Drawing Sheets

CONTINUOUSLY VARIABLE TRANSMISSION

FIELD

The present invention relates to a continuously variable transmission with a continuously variable transmission mechanism that includes an input member, an output member, and rotary members sandwiched between them and that steplessly changes a transmission ratio between the input and output members by tilting the rotary members.

BACKGROUND

Patent Literature 1 below discloses this type of continuously variable transmission. Conventionally, as this type of continuously variable transmission, a so-called toroidal type continuously variable transmission is known, which includes an input disk as an input member, an output disk as an output member, and a friction roller as a rotary member, and which alters a transmission ratio by altering the tilting angle of the friction roller. This toroidal type continuously variable transmission is disclosed in Patent Literature 2 below. The continuously variable transmission cited in this Patent Literature 2 decreases the flow rate of lubricant cooling liquid as a transmission ratio becomes larger than 1 or smaller than 1. Additionally, Patent Literature 3 below discloses an in-wheel motor, which includes an oil introduction passage formed by making a hollow in an output shaft, a stator cooling passage formed by accommodating a motor case in a cylindrical housing, and an oil supply device for supplying oil to the oil introduction passage and which allows the oil introduction passage and stator cooling passage to communicate with one another via a deceleration gear mechanism, thereby cooling a stator coil.

CITATION LIST

Patent Literature

Patent Literature 1: Japanese Patent Application Laid-open No. 2008-075878
Patent Literature 2: Japanese Patent Application Laid-open No. 2004-052929
Patent Literature 3: Japanese Patent Application Laid-open No. 2007-195320

SUMMARY

Technical Problem

The continuously variable transmission has various sliding portions, and heat is generated as the sliding portions slide. It is, therefore, necessary to provide the continuously variable transmission with a cooling means such as restraining such heat generation.

It is, accordingly, an object of the present invention to provide a continuously variable transmission that overcomes the disadvantages of such conventional examples and is able to perform cooling appropriately.

Solution to Problem

In order to achieve the above mentioned object, a continuously variable transmission according to the present invention including a continuously variable transmission mechanism that includes an input member, an output member, and rotary members sandwiched between them and that steplessly changes a transmission ratio between the input member and the output member by tilting the rotary members, wherein cooling performance of a cooling device for the continuously variable transmission mechanism is enhanced as the transmission ratio becomes larger than 1 or smaller than 1.

Here, it is desirable that the cooling device cools the continuously variable transmission mechanism by supplying coolant thereto, and the cooling performance is desirably adjusted by adjusting flow rate of the coolant to the continuously variable transmission mechanism.

Further, in the present invention, it is desirable that the continuously variable transmission mechanism is incorporated in a rotary electrical machine. In this case, it is desirable that the cooling device also cools the rotary electrical machine.

In order to achieve the above mentioned object, a continuously variable transmission according to the present invention including a continuously variable transmission mechanism that includes an input member, an output member, and rotary members sandwiched between them and that steplessly changes a transmission ratio between the input member and the output member by tilting the rotary members, the continuously variable transmission includes a cooling performance adjusting device configured to enhance cooling performance of a cooling device for the continuously variable transmission mechanism as the transmission ratio becomes larger than 1 or smaller than 1.

Here, it is desirable that the cooling device cools the continuously variable transmission mechanism by supplying coolant thereto, and a flow rate adjusting device is desirably provided to adjust the cooling performance of the cooling device by adjusting flow rate of the coolant to the continuously variable transmission mechanism.

Here, it is desirable that the cooling device also cools a rotary, electrical machine incorporating the continuously variable transmission mechanism, and the cooling performance adjusting device is desirably provided between the continuously variable transmission mechanism and the rotary electrical machine.

In order to achieve the above mentioned object, a continuously variable transmission according to the present invention including as a continuously variable transmission mechanism a traction planetary gear mechanism that includes a ball type pinion, wherein cooling performance of a cooling device for the continuously variable transmission is enhanced as a transmission ratio of the continuously variable transmission mechanism becomes larger than 1 or smaller than 1.

Advantageous Effects of Invention

The continuously variable transmission according to the present invention enhances the cooling performance of the cooling device of a continuously variable transmission mechanism as a transmission ratio becomes larger than 1 or smaller than 1. Specifically, in this continuously variable transmission, although heat generation increases as a transmission ratio becomes larger than 1 or smaller than 1, areas with higher heat generation exhibit higher cooling performance. Accordingly, the continuously variable transmission is able to exhibit an appropriate cooling effect and improve the durability of the continuously variable transmission mechanism. Furthermore, this continuously variable transmission is able to adjust the cooling performance based on transmission ratio information that is obtainable. Accordingly, the need for a temperature detector, such as a temperature sensor, temperature estimation device, etc. is obviated, thus restraining cost increase of such devices. That is, this continuously variable transmission is able to improve the cooling performance and hence durability of its continuously variable transmission mechanism while restraining cost increase.

Furthermore, in this continuously variable transmission, in the case where the continuously variable transmission mechanism is incorporated in a rotary electrical machine, the rotary electrical machine is also cooled by the cooling device of the continuously variable transmission mechanism, thereby not only improving the durability of the rotary electrical machine by virtue of the cooling performance improvement, but also achieving a lower cost and a smaller size compared to the case where a cooling device for the rotary electrical machine is additionally provided. Furthermore, in this continuously variable transmission, a cooling performance adjusting device for the cooling device of the continuously variable transmission mechanism is provided between the continuously variable transmission mechanism and the rotary electrical machine, thereby cooling both the continuously variable transmission mechanism and rotary electrical machine appropriately, and hence improving durability.

DESCRIPTION OF EMBODIMENTS

One embodiment of a continuously variable transmission according to the present invention will be described in detail below with reference to the drawings. It should be noted that the present invention is not limited by the embodiment.

[Embodiment]

The embodiment of the continuously variable transmission according to the present invention will be described with reference to FIGS. 1 to 9.

The continuously variable transmission according to the present embodiment includes an input member, output member, and rotary members sandwiched between them, and steplessly changes a transmission ratio between the input member and output member by tilting the rotary members. In this type of continuously variable transmission, the input and output members are pressed against the rotary members, and frictional force is generated between the input and output members, thus enabling torque transmission between the input and output members by means of frictional force. For example, this continuously variable transmission has, as a continuously variable transmission mechanism, a so-called traction planetary gear mechanism (e.g., a traction planetary gear mechanism having a ball type pinion) that includes a plurality of rotary elements. To be specific, using various configurations described below, this continuously variable transmission includes: an input disk serving as an input member with a connection relation to an input shaft; an output disk serving as an output member with a connection relation to an output shaft; and planetary balls serving as rotary members. In this continuously variable transmission, the input disk and output disk are pressed against the planetary balls and frictional force is generated between them, thereby transmitting torque between the input and output disks. Then, in this continuously variable transmission, while the torque is kept transmittable, the ratio of the contact radius of the input disk and each planetary ball to the contact radius of the output disk and each planetary ball is altered, thereby steplessly changing the ratio of the rotational speed (the number of rotations) of the input disk to the rotational speed (the number of rotations) of the output disk, in other words, the transmission ratio that is the ratio of the rotational speed of the input shaft to that of the output shaft. Now, a detailed description is given with reference to FIG. 1.

Figure 1:
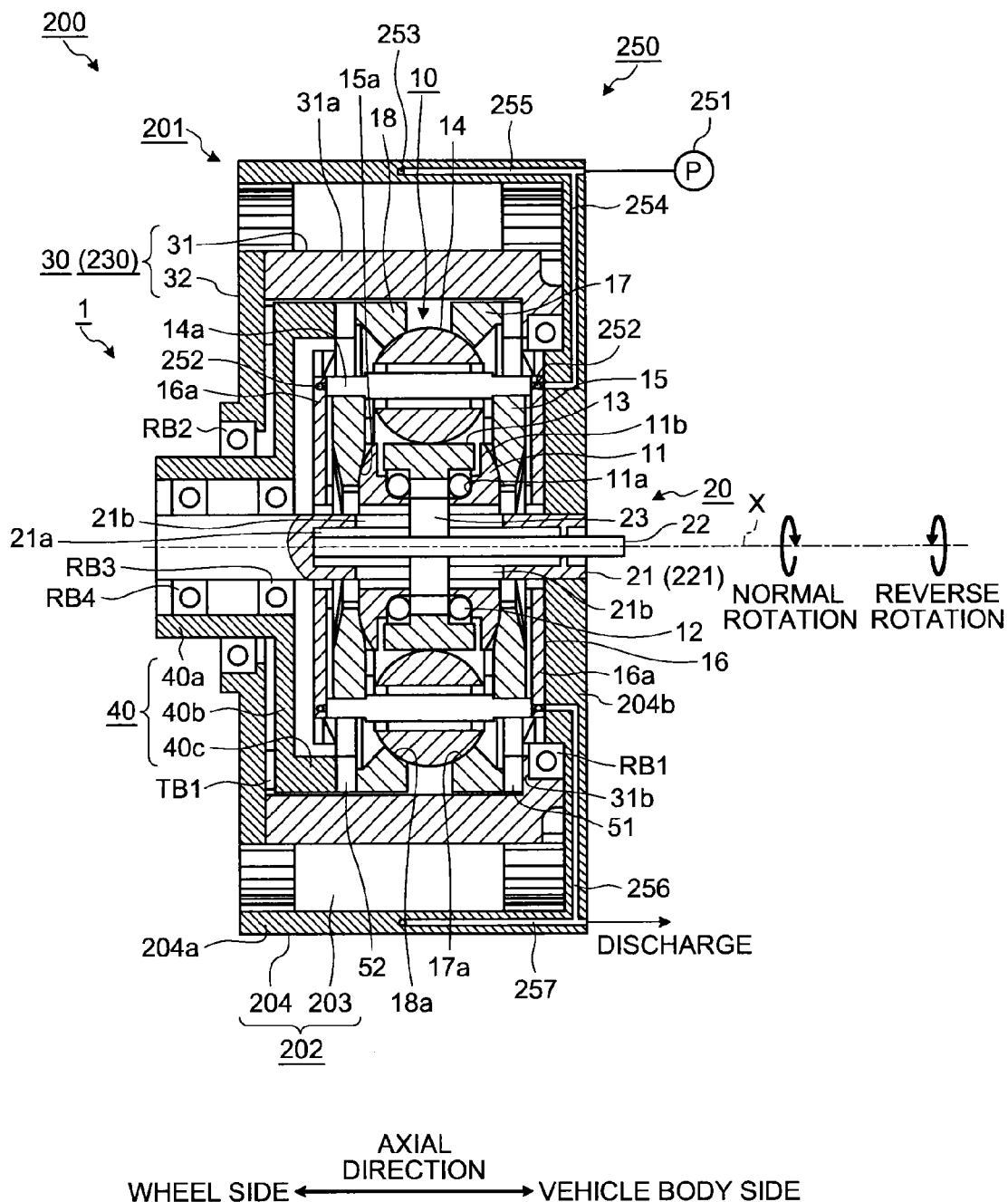
FIG. 1 is a cross-sectional view, cut along an axial direction, of the configuration of one embodiment of a continuously variable transmission according to the present invention, and illustrates an example of a case where the present embodiment is applied in an in-wheel motor.

Symbol 1 in FIG. 1 represents a continuously variable transmission according to the present embodiment. In FIG. 1, as described below, the continuously variable transmission 1 disposed inside an in-wheel motor 200, which is an example of an application, is shown. This continuously variable transmission 1 includes: a continuously variable transmission mechanism 10 for steplessly changing a transmission ratio; a shift mechanism 20 for actuating this continuously variable transmission mechanism 10; and two rotation torque transmission shafts, one functioning as an input shaft, and the other as an output shaft. For the purpose of convenience, in the present embodiment, a description is given based on the assumption that one of the rotation torque transmission shafts is an input shaft 30 and the other is an output shaft 40. However, the relation between the input side and the other side may be exchanged. That is, the input shaft 30 may be replaced by an output shaft, and the output shaft 40 may be replaced by an input shaft. Alternatively, the input shaft 30 may be configured so as to function as an output shaft as well, and the output shaft 40 configured so as to function as an input shaft as well. If, as described below, this continuously variable transmission 1 is applied in the in-wheel motor 200, its input shaft 30 serves as a rotor 230 for a motor generator section 201.

In the continuously variable transmission 1, its input shaft 30 and output shaft 40 are disposed on the same axis. The input shaft 30 and output shaft 40 have a common axis X, as shown in FIG. 1. Hereafter, unless specified in particular, a direction along the rotation axis X is referred to as an axial direction, and a direction around the rotation axis X as a circumferential direction. Additionally, a direction orthogonal to the rotation axis X is referred to as a radial direction. Among the radial directions, a direction toward the inside is referred to as a radial direction inside and a direction toward the outside as a radial direction outside.

First, the shift mechanism 20 will be described.

The shift mechanism 20 of the present embodiment includes a central shaft 21 of the continuously variable transmission 1, a shift shaft 22, and a shift key 23. This shift mechanism 20 moves the shift shaft 22 and the shift key 23 relative to each other in relation to the central shaft 21, thereby moving an idler plate 11 of the continuously variable transmission mechanism 10 (described below) in the axial direction, thereby changing a transmission ratio steplessly.

The central shaft 21 is an idler shaft having the rotation axis X as its central axis, and is fixed to a fixing part of the continuously variable transmission as to a vehicle body or housing, not shown. That is, this central shaft 21 is a fixed shaft configured so as not to be rotated relative to the fixing part. Specifically, this central shaft 21 is cylindrically molded around the rotation axis X, and has a hollow part $21a$ open at one end in the axial direction and two slits $21b$ for communication between this hollow part $21a$ and an exterior of the radial direction outside.

Figure 2:
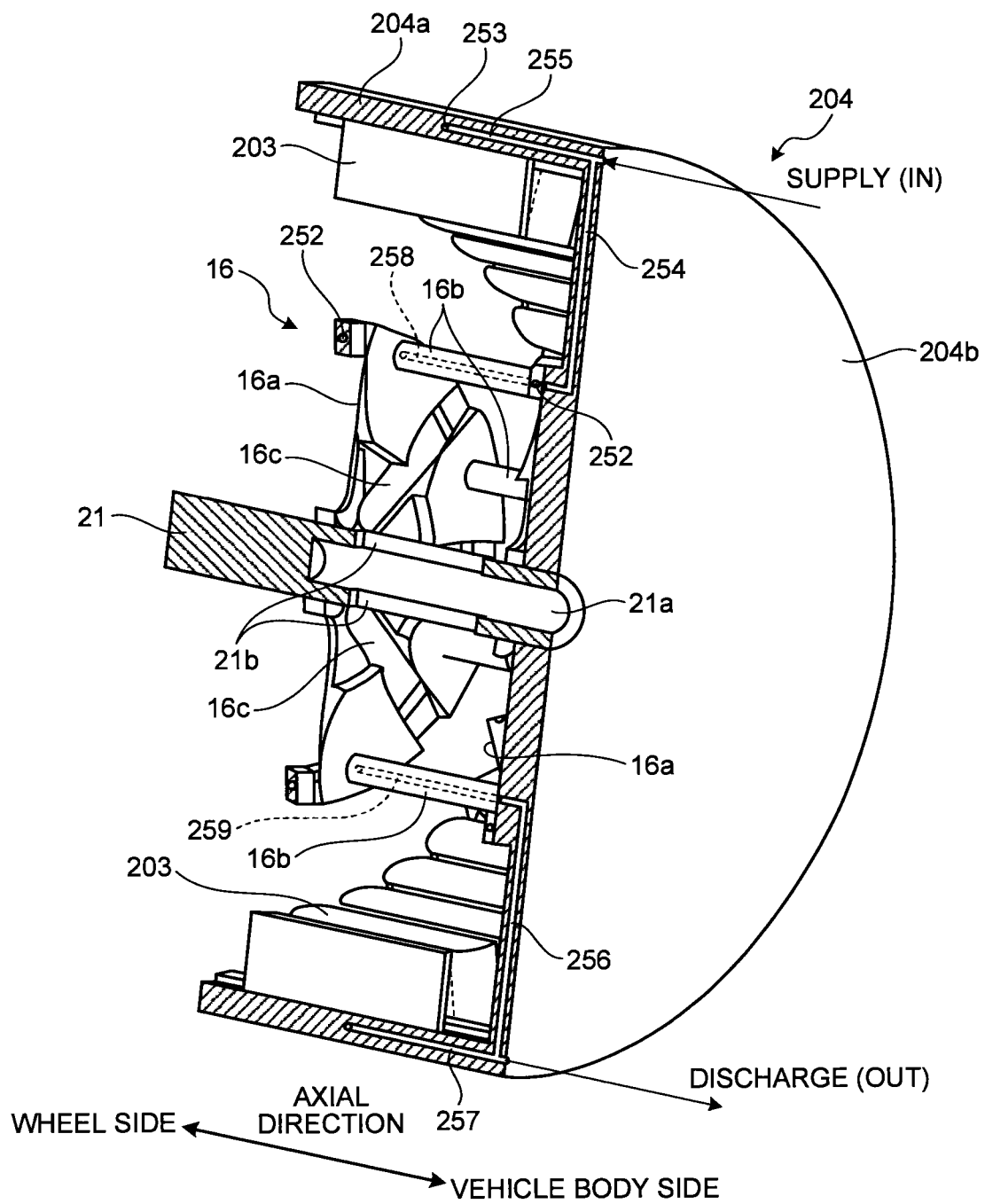
FIG. 2 is a perspective sectional view illustrating an application example in which the continuously variable transmission according to the present embodiment is applied in an in-wheel motor.

The hollow part $21a$ has a cylindrical shape with the rotation axis X as its central axis. This hollow part $21a$ supports the inserted shift shaft 22 such that the shift shaft 22 is rotated freely relative to the central shaft 21. For the support, a bearing or the like, for example, not shown, may be used. Each of the slits $21b$ is a through-hole extending from the outer circumferential surface of the central shaft 21 toward the hollow part $21a$ such that each slit's axial direction coincides with its lengthwise direction, as shown in FIGS. 1 and 2. These two slits $21b$ are formed so as to be symmetrical around the rotation axis X.

The shift shaft 22 is, for example, cylindrically molded. The shift shaft 22 is molded to be such a length that when the shift shaft 22 is inserted into the hollow part $21a$ so that the rotation axis X comes to its central axis, its one end contacts the wall surface of the hollow part $21a$ in the axial direction and the other end projects from an opening of the hollow part $21a$. Here, the shift shaft 22 inserted in the hollow part $21a$ is projected from a disk part $204b$ of an outer case 204 (described below). In addition, this shift shaft 22 has a male screw part $22a$, shown in FIG. 3, formed helically in a circumferential direction in the outer circumferential surface thereof connecting its areas that face the two slits $21b$ when the shift shaft 22 is inserted in the hollow part $21a$.

Figure 3:
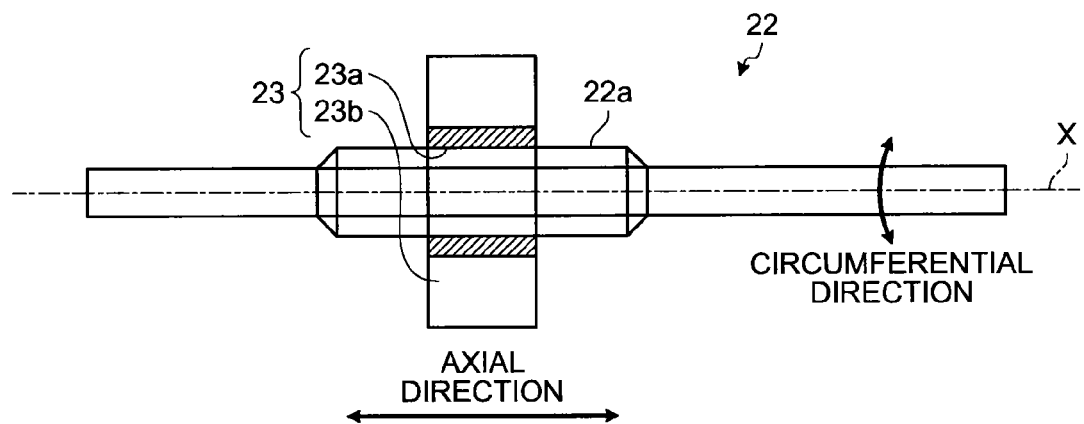
FIG. 3 is a view of a shift shaft and a shift key of the continuously variable transmission of the present embodiment.

The shift key 23 has a female screw part $23a$, which is helically engaged with the male screw part $22a$ of the shift shaft 22, as shown in FIG. 3. This female screw part $23a$ is helically formed in the internal circumferential surface of a cylindrical part. This shift key 23 has key parts $23b$ movable along the slits $21b$ lengthwise, as shown in FIG. 3. Each of these key parts $23b$ is a plate-like part projecting radially outside from the outer circumferential surface of the cylindrical part in which the female screw part $23a$ is formed. A key part $23b$ is provided for each slit $21b$. Specifically, as shown in FIG. 1, each key part $23b$ is molded to be such a shape as to extend through the corresponding slit $21b$ and project radially outside beyond the outer circumferential surface of the central shaft 21. In addition, as shown in FIG. 1, the width in axial direction of key parts $23b$ is molded so as to be shorter than the lengthwise dimension of the slits $21b$.

Accordingly, when the shift shaft 22 is rotated in a circumferential direction, the key parts $23b$ of the shift key 23 are locked by the wall surface of the slits $21b$ in the circumferential direction and, therefore, the shift key 23 is moved in the axial direction according to a rotating direction by the screw action of the male screw part $22a$ and the female screw part $23a$. That is, each key part $23b$ of this shift key 23 is able to be moved reciprocally in the axial direction within the corresponding slit $21b$ by the rotation of the shift shaft 22. Here, the shift shaft 22 is rotated in a desired circumferential direction by a shift device, not shown. For example, the shift device has an actuator, such as an electric motor, as a drive source, and also may have a link mechanism as required.

First, the continuously variable transmission mechanism 10 according to the present embodiment is described in detail.

This continuously variable transmission mechanism 10 includes: the idler plate 11, bearing balls 12, an idler roller 13, planetary balls 14, tilting arms 15, a carrier 16, an input disk 17, and an output disk 18.

The idler plate 11 is a bearing member supporting the idler roller 13 rotatably. This idler plate 11 is molded in a cylindrical shape around the rotation axis X. The central shaft 21 is inserted inward the idler plate 11. Specifically, this idler plate 11 is molded such that the diameter of its internal circumferential surface is greater than the diameter of the outer circumferential surface of the central shaft 21, thus being able to move reciprocally in the axial direction relative to the central shaft 21. This idler plate 11 is molded such that its dimension in the axial direction is substantially equal to the dimension of the lengthwise direction of the slits $21b$. In addition, this idler plate 11 is molded so that a vertical section of it, cut along the axial direction, has a shape tapering radially outward.

This idler plate 11 is attached to the outer circumferential part of the central shaft 21 via the key parts $23b$ of the shift key 23. For example, the projecting end of each key part $23b$ is fitted to the internal circumferential part of this idler plate 11. Accordingly, as the shift key 23 moves in the axial direction, this idler plate 11 reciprocally moves relative to the central shaft 21 in the axial direction.

Further, this idler plate 11 has an annular groove $11a$, which is circumferentially formed so as to extend from an outer circumferential surface toward the radial direction inside. This annular groove $11a$ is formed in the intermediate portion of the idler plate 11 in the axial direction. The annular groove $11a$ is formed such that the annular boundary portion between its bottom and each sidewall surface forms a gently concave curved surface in the shape of an arc. Here, the spherical bearing balls 12 are arranged in the annular boundary portion. That is, the concave curved surface of each boundary portion serves as a bearing surface on which the bearing balls 12 are arranged.

The bearing balls 12 support the idler roller 13 rotatably in a circumferential direction.

The idler roller 13 serves as a rotation shaft for the planetary balls 14. This idler roller 13 is molded such that its main body portion has a cylindrical shape around the rotation axis X as its central axis. The idler roller 13 is disposed in the annular groove $11a$ of the idler plate 11 rotatably relative to the idler plates 11. Specifically, within the range where the idler roller 13 smoothly rotates in a circumferential direction relative to the idler plate 11, the axial dimension of the idler roller 13 is substantially equal to the groove width of the annular groove $11a$. In addition, the axial intermediate portion of the internal circumferential surface of the main body portion of this idler roller 13 has a cylindrical part shorter than the main body portion in the axial direction and smaller than the main body portion in the diameter of the internal circumferential surface. Both ends of the internal wall of this cylindrical part in the axial direction are disposed in contact with the bearing balls 12. That is, this idler roller 13 is supported by the idler plate 11 via the bearing balls 12, disposed in the boundary portions of the annular grooves 11a, such that the idler roller 13 is rotatable in a circumferential direction relative to the idler plate 11. Accordingly, this idler roller 13 can serve as a rotation shaft for the planetary balls 14 disposed in contact with the outer circumferential surface of the main portion of the idler roller 13. In addition, as the idler plate 11 moves in the axial direction, the idler roller 13, together with the idler plate 11, is able to move reciprocally in the axial direction relative to the central shaft 21.

Figure 4:
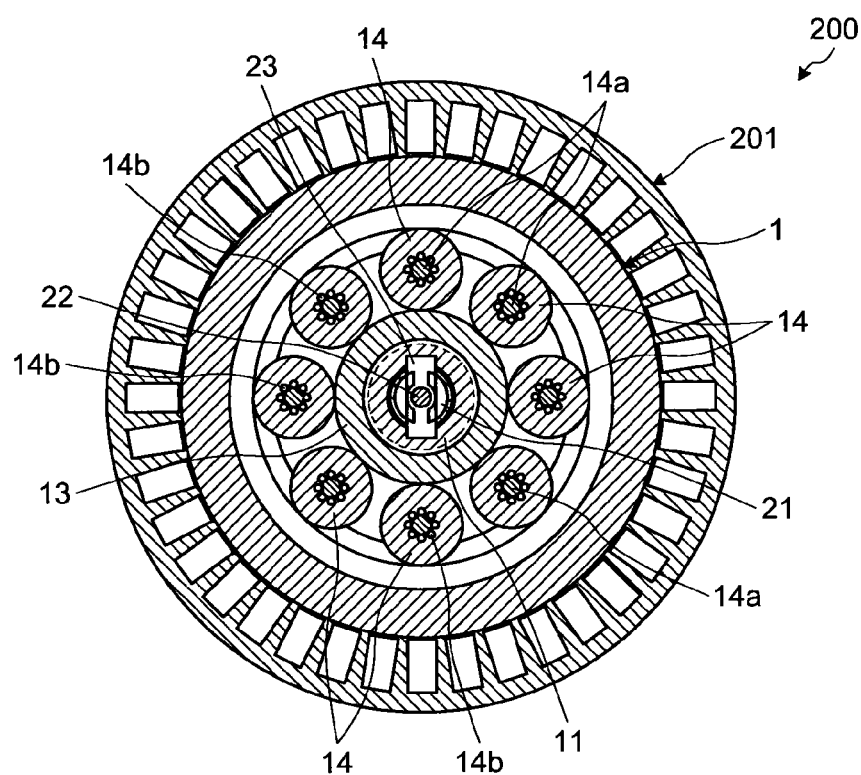
FIG. 4 is a sectional view, cut perpendicular to the axial direction, of a main portion relating to transmission carried out by the continuously variable transmission according to the present embodiment, and illustrates an example in which the present embodiment is applied in an in-wheel motor.

The planetary balls 14 are rolling elements and are equivalent to a ball type pinion in a traction planetary gear mechanism. It is preferable that each planetary ball 14 be a perfect sphere, as shown in FIGS. 1 and 4. However, as long as its external surface is smoothly curved, it may be, for example, in an oval shape with a rugby-ball-like cross-section.

Each of these planetary balls 14 is supported by a support shaft 14a, extending through the center thereof, so as to be rotatable. For example, each planetary ball 14 is able to rotate relative to the support shaft 14a (that is, to rotate around itself) by means of bearings 14b disposed between the outer circumferential surface of the support shaft 14a and the planetary balls 14.

Each support shaft 14a is disposed such that its central axis is located in a plane including the rotation axis X. Its reference position is the position where its central axis is parallel to the rotation axis X, as shown in FIG. 1. Here, both ends of the support shaft 14a are jutted out from the outer circumferential surface (outer circumferential curved surface) of the corresponding planetary ball 14, and are attached to the tilting arms 15 (described below). Accordingly, as the tilting arms 15 move, this support shaft 14a swings (tilts) to a position tilted relative to the reference position shown in FIG. 1 or to the reference position from a position tilted relative to the reference position. The tilt is made within a plane including the central axis of each support shaft 14a and the rotating axis X.

Here, a plurality of planetary balls 14, for example eight planetary balls 14 as shown in FIG. 3, are provided on the outer circumferential side of the idler roller 13. Hence, according to the number of planetary balls 14, support shafts 14a and bearings 14b are also disposed. The planetary balls 14 are disposed substantially so as not to be in contact with one another, by being provided at specific intervals from one another to prevent pulling and sliding torque between them when the planetary balls 14 are rolled on the outer circumferential surface of the idler roller 13.

The tilting arms 15 are members for tilting central axis of the corresponding planetary ball 14, namely the central axis of the support shaft 14a, by causing tilting force to act on the support shaft 14a and the planetary ball 14 as the idler plate 11 moves in the axial direction. Each of the tilting arms 15 is molded in a shape extending and disposed perpendicular to the rotation axis X. Specifically, each tilting arm 15 is molded such that its radially inward leading end tapers. These tilting arms 15 are disposed at both ends of each support shaft 14a, and the ends of each support shaft 14a are attached to radially outside ends of the corresponding tilting arms 15. In addition, these tilting arms 15 are disposed so as not to move in the axial direction relative to the central shaft 21 and so as not to rotate in a circumferential direction relative to the central shaft 21.

A pair of tilting arms 15 attached to both the ends of each support shaft 14a are provided for each combination of the support shaft 14a and planetary ball 14. The wall surfaces of both the axial ends of the idler plate 11 in the axial direction are sandwiched between the tapering wall surfaces of the radially inward leading ends of each pair of tilting arms 15. The tapering wall surfaces of the pair of tilting arms 15 are used as contact surfaces 15a with respect to the idler plate 11. The leading ends of each pair of tilting arms 15 are molded to have a shape in which the space between the contact surfaces 15a opposite each other in the axial direction becomes wider toward the radial inward.

Compared to this, in the idler plate 11, the wall surfaces of both its axial ends serve as contact surfaces 11b with respect to the corresponding tilting arms 15. In this idler plate 11, as stated above, a vertical section cut along its axial direction has a tapering shape toward the radial direction outside. Due to this, in the idler plate 11, the contact surfaces 11b of both its ends also have a shape tapering radially outside in a section cut along its axial direction. In this case, each contact surface 11b is in the form of a convex curved surface in the direction of the axial outside.

By configuring the contact surfaces 11b of the idler plate 11 and the contact surfaces 15a of the tilting arms 15 in such a manner, the contact surfaces 11b of the idler plate 11 and the corresponding contact surfaces 15b of the tilting arms 15 are disposed in point-contact or line-contact with each other. Accordingly, in each contact area, load applied as a result of the movement of the idler plate 11 in the axial direction acts on the corresponding tilting arm 15 as a force oriented obliquely outward relative to the central shaft 21. By virtue of this force, the tilting arms 15 slant the corresponding support shaft 14a in the plane mentioned above. Thus, the support shafts 14a and corresponding planetary balls 14 are slanted in the plane by the force acting on the corresponding tilting arms 15 as a result of the movement of the idler plate 11 in the axial direction.

A carrier 16 is in the form of a so-called stator drum, and holds the planetary balls 14, support shafts 14a, and tilting arms 15 so as to prevent these from being moved in the axial direction relative to the central shaft 21. This carrier 16 has a pair of disk parts 16a with the rotation axis X as their central axes. The disk parts 16a are disposed in positions sandwiching the planetary balls 14, support shafts 14a, tilting arms 15, etc., so as neither to be moved in the axial direction relative to the central shaft 21 nor rotated in a circumferential direction relative to the central shaft 21.

This carrier 16 is configured so as to have a basket shape as a whole, as shown in FIG. 2, by connecting these disk parts 16a by use of a plurality of connection shafts 16b. Thus, this carrier 16 is provided in its outer circumferential surface with an open portion. Each planetary ball 14 is disposed such that part of it protrudes through the open portion in the direction of the radial direction outside beyond the outer circumferential surface of the carrier 16.

In this carrier 16, as shown in FIG. 2, the opposite faces of the disk parts 16a have radial grooves 16c, the number of which is equal to the number of pairs of tilting arms 15 described above. The radial grooves 16c radiate around the rotation axis X and are formed at equal intervals in a circumferential direction. Each radial groove 16c is formed in a position, shape and size corresponding to a tilting arm 15. For example, each radial groove 16c is formed from the central part to the outer circumferential edge. Here, the tilting arms 15 are disposed in the corresponding radial grooves 16c so as to perform the above tilting operation and so as to neither move in the axial direction relative to the central shaft 21 nor rotate in a circumferential direction relative to the central shaft 21.

The input disk 17 and the output disk 18 are in contact with the external surface of each planetary ball 14 exposed radially outside from the open portion of the carrier 16, and mutually transmit mechanical power, in other words, torque, among the planetary balls 14. The input disk 17 is an input-side rotation body to which torque is input from an input shaft 30 (described below), and forms an input member for the continuously variable transmission mechanism 10. On the other hand, the output disk 18 is an output-side rotation body by which torque transmitted via each planetary ball 14 from the input disk 17 is output to an output shaft 40 (described below), and forms an output member for the continuously variable transmission mechanism 10.

Each of the input disk 17 and the output disk 18 is molded in the form of an annular ring that uses the rotation axis X as its central axis. The input disk 17 and the output disk 18 are disposed opposite each other in the axial direction so as to sandwich the planetary balls 14 between them. The input disk 17 and the output disk 18 have contact surfaces 17a and 18a respectively, which are in contact with the external surface of each planetary ball 14. The contact surface 17a is provided on the end of the input disk 17, which end is on the radial direction outside. On the other hand, the contact surface 18a is provided on the end of the output disk 18, which end is on the radial direction outside. Each of the contact surfaces 17a and 18a has a concave arc surface equal in curvature to the curved external surfaces of the planetary balls 14.

The input disk 17 is molded such that its outside diameter is slightly smaller than the inside diameter of a cylindrical part 31a of a cylindrical member 31 of the input shaft 30 (described below). This input disk 17 is disposed between the planetary balls 14 and a annular part 31b of the cylindrical member 31 in the axial direction. Therefore, the radially outside ends of the input disk 17 face the annular surface of the annular part 31b of the cylindrical member 31 in the axial direction.

Likewise, the output disk 18 is molded such that its diameter is slightly smaller than the inside diameter of the cylindrical part 31a of the cylindrical member 31. This output disk 18 is disposed between the planetary balls 14 and a second cylindrical part 40c of an output shaft 40 (described below) in the axial direction. Therefore, the radially outside ends of the output disk 18 face the annular end face of the second cylindrical part 40c in the axial direction.

The continuously variable transmission 1 according to the present embodiment is provided with an input-side cam mechanism 51 and an output-side cam mechanism 52.

The input-side cam mechanism 51 is used for converting torque acting between the cylindrical member 31 of the input shaft 30 and the input disk 17 into thrust oriented toward the axis, and employs, for example, a torque cam mechanism. This input-side cam mechanism 51 is disposed between the annular surface of the annular part 31b of the cylindrical member 31 and the radially outside ends of the input disk 17. Together with the input shaft 30, this input-side cam mechanism 51 forms a torque input part for transmitting torque from outside to the input disk 17.

The output-side cam mechanism 52 is used for converting torque acting between the output disk 18 and the output shaft 40 into thrust oriented toward the axis, and may also employ a torque cam mechanism. This output-side cam mechanism 52 is disposed between the externally outside ends of the output disk 18 and the annular end face of the second cylindrical part 40c of the output shaft 40. Together with the output shaft 40, this output-side cam mechanism 52 forms a torque output part for transmitting the torque of the output disk 18 to the outside after transmission shift.

Figure 5:
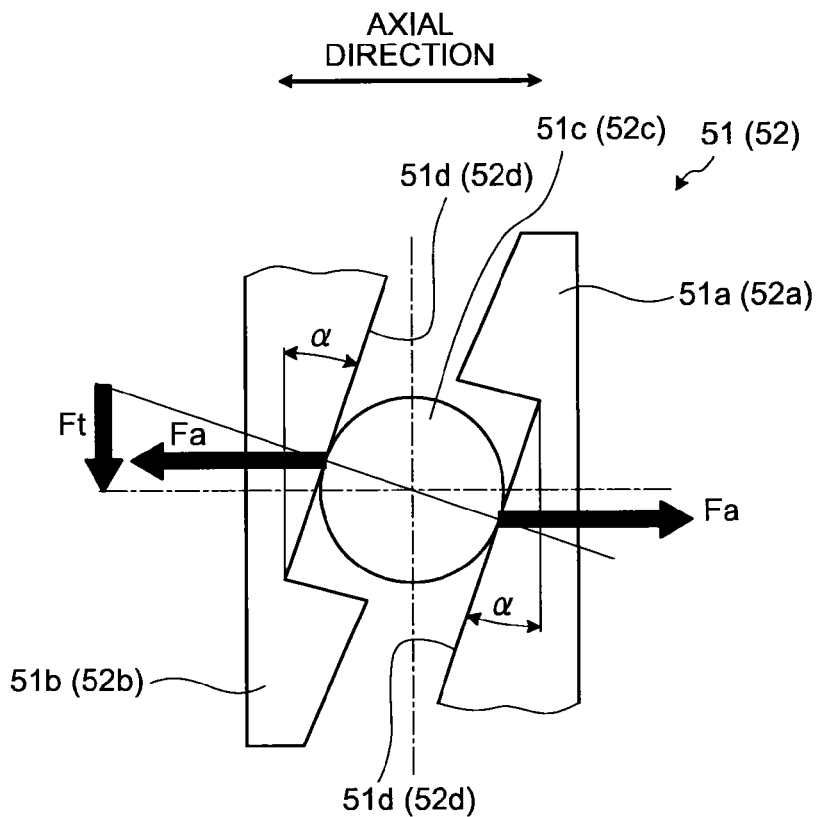
FIG. 5 is a partial schematic view illustrating an example of the input side and output side cam mechanisms of the continuously variable transmission of the present embodiment.

FIG. 5 illustrates an example of the principle of the configuration of the input-side cam mechanism 51 and the output-side cam mechanism 52. The input-side cam mechanism 51 exemplified here is used to generate axial thrust when the input shaft 30 rotates using torque in a normal direction and rotates the input disk 17 in the same direction as the torque or when the input disk 17 rotates using torque in the reverse direction to that direction and rotates the input shaft 30 in the same direction as this torque. Here, for convenience, rotation of the input shaft 30 and the like in one direction is referred to as "normal rotation", and rotation in the reverse direction is referred to as "reverse rotation".

The input-side cam mechanism 51 includes: a first rotary member 51a and a second rotary member 51b, with the rotation axis X as their rotation axes, disposed opposite each other on this rotation axis X; and a cam roller 51c sandwiched between the opposite faces of the first and second rotary members 51a and 51b. Here, this cam roller 51c is sandwiched between cam faces 51d formed on the opposite faces of the first and second rotary members 51a and 51b. One of the cam faces 51d inclines such that the space between the cam faces in the axial direction relative to a reference plane gradually widens in a circumferential direction during normal rotation whereas the other inclines such that the space between the cam faces in the axial direction relative to the reference plane gradually narrows in a circumferential direction during normal rotation. The reference plane refers to virtual planes including ones perpendicular to the rotation axis X. The number of cam rollers 51c is more than one and, according to this number, cam faces 51d are also formed.

Here, the first rotary member 51a is disposed so as to rotate integrally with the annular surface of the annular part 31b of the cylindrical member 31 whereas the second rotary member 51b is disposed so as to rotate integrally with the radially outside ends of the input disk 17. Therefore, in the input-side cam mechanism 51, when torque in the direction of normal rotation is input to the input shaft 30 or torque in the reverse direction is input to the input disk 17, the space between the cam faces 51d narrows, with the result that the cam faces 51d sandwich the corresponding cam rollers 51c such that the cam faces 51d and the corresponding cam rollers 51c are integrated. Consequently, in the input-side cam mechanism 51, when torque in the direction of normal rotation is input to the input shaft 30, the torque is transmitted to the input disk 17 from the cylindrical member 31; when torque in the direction of reverse rotation is input to the input disk 17, the torque is transmitted to the cylindrical member 31 (input shaft 30) from the input disk 17.

Further, in this input-side cam mechanism 51, when torque in the direction of normal rotation is input to the input shaft 30 or when torque in the direction of normal rotation is input to the input disk 17, thrust in the axial direction is generated according to the torque and the inclination angles of the cam faces 51d. An outline of this will now be described. If input torque is Tin, the number of cam rollers 51c is n, and the radius of each cam roller 51c in the area between the first and second rotary members 51a and 51b is r, load Ft in a circumferential direction (in a tangential direction of) in the area where the cam roller 51c is sandwiched is expressed by equation 1 below.

$$Ft = Tin/(n \cdot r) \quad (1)$$

If the inclination angle of each cam face 51d is α, the thrust Fa acting in the axial direction is expressed by the equation 2 below.

$$Fa = Ft/\tan(\alpha/2) \quad (2)$$

Here, the output-side cam mechanism 52 has the same configuration as the input-side cam mechanism 51. Specifically, the output-side cam mechanism 52 has a first rotation member 52a, a second rotation member 52b, cam rollers 52c, and cam faces 52d. Here, the first rotation member 52a is disposed so as to rotate integrally with the radially outside ends of the output disk 18 whereas the second rotation member 52b is disposed so as to rotate integrally with the annular end face of the second cylindrical part 40c of the output shaft 40 (described below). Therefore, in the output-side cam mechanism 52, when torque in the direction of normal rotation is input to the output disk 18 or torque in the direction of reverse direction is input to the output shaft 40, the space between the cam faces 52d narrows, with the result that the cam faces 52d sandwich the corresponding cam rollers 52c such that the cam faces 52d and the corresponding cam rollers 52c are integrated. Consequently, in the output-side cam mechanism 52, when torque in the direction of normal rotation is input to the output disk 18, the torque is transmitted to the output shaft 40 from the output disk 18; when torque in the direction of reverse rotation is input to the output shaft 40, the torque is transmitted to the output disk 18 from the output shaft 40. Also, in this output-side cam mechanism 52, when torque in the direction of normal rotation is input to the output disk 18 or when torque in the direction of reverse rotation is input to the output shaft 40, thrust in the axial direction is generated according to the torque and the inclination angles of the cam faces 52d.

Thus, in the continuously variable transmission mechanism 10, when torque in the direction of normal rotation is input to the input shaft 30 or when torque in the direction of reverse rotation is input to the input disk 17, the torque is transmitted between the input shaft 30 and the input disk 17 via the input-side cam mechanism 51, and also axial thrust corresponding to the torque is generated. At this time, the input disk 17 is pressed against the planetary balls 14 by the thrust. Additionally, when torque in the direction of normal rotation is input to the output disk 18 or when torque in the direction of reverse rotation is input to the output disk 18, the torque is transmitted between the output disk 18 and the output shaft 40 via the output-side cam mechanism 52, and also axial thrust corresponding to the torque is generated. At this time, the output disk 18 is pressed against the planetary balls 14 by this thrust. In this continuously variable transmission mechanism 10, transmission torque capacity is set according to the respective thrusts for the input-side cam mechanism 51 and the output-side cam mechanism 52, a coefficient of friction between the input disk 17 and each planetary ball 14, and a coefficient of friction between the output disk 18 and each planetary ball 14.

In this continuously variable transmission mechanism 10, as described above, the input and the output disks 17 and 18 are pressed against the planetary balls 14 according to torques on the input and the output sides.

The input shaft 30 according to the present embodiment forms an input hub, and includes the cylindrical member 31 molded in the shape of a cylinder with the rotation axis X as its central axis, and an annular member 32 molded in the shape of an annular plate with the rotation axis X as its central axis.

The cylindrical member 31 includes: the cylindrical part 31a with the rotation axis X as its central axis; and the flange-like annular part 31b extended radial direction inside from one end (on the outer circumferential side) of the cylindrical part 31a (i.e., the end on the vehicle body side in the case where the continuously variable transmission is applied in the in-wheel motor 200). This annular part 31b is used to transmit the torque of the input shaft 30 to this continuously variable transmission mechanism 10 via the input-side cam mechanism 51 and receives the input of torque from the continuously variable transmission mechanism 10 via the input-side cam mechanism 51.

The annular member 32 is set such that its outside diameter is substantially equal to that of the outside diameter of the cylindrical part 31a of the cylindrical member 31. The annular member 32 is disposed so as to be rotatable integrally with the other end of the cylindrical member 31 (i.e., the end on the wheel side in the case where this continuously variable transmission is applied in the in-wheel motor 200). The inside diameter of this annular member 32 is set to be smaller than that of the annular part 31b of the cylindrical member 31.

This input shaft 30 is supported so as to be able to rotate around the rotation axis X relative to the central shaft 21 via radial bearings RB1 and RB2 and thrust bearing TB1.

The radial bearing RB1 is disposed between the input shaft 30 and the outer case 204 in the case where the continuously variable transmission is applied in the in-wheel motor 200 (described below). The annular part 31b of the cylindrical member 31 of the input shaft 30 has a stepped part, which uses its annular wall surface opposite to the input-side cam mechanism 51 in the axial direction together with its internal circumferential surface on the radial direction inside to hold the radial bearing RB1. Also, the disk part 204b of the outer case 204 has a stepped part, which uses its wall surface (bottom surface) in the axial direction together with its outer circumferential surface on the radial direction outside to hold the radial bearing RB1. The outer ring of the radial bearing RB1 is fitted in the internal circumferential surface of the stepped part of the annular part 31b, and the inner race is fitted on the outer circumferential surface of the stepped part of the disk part 204b, thereby enabling rotation of the input shaft 30 and outer case 204 relative to one another. As described below, the disk part 204b of the outer case 204 is fitted on the central shaft 21 (stator shaft 221); therefore, the input shaft 30 can rotate around the rotation axis X relative to the vehicle body and immovable central shaft 21, in other words, relative to the outer case 204 and stator shaft 221 (i.e., stator 202) in the case where continuously variable transmission is applied in the in-wheel motor 200.

The radial bearing RB2 is disposed between the input shaft 30 and the output shaft 40 (described below). The internal circumferential surface of the annular member 32 of the input shaft 30 has a stepped part, which uses its annular wall surface in the axial direction together with its internal circumferential surface on the radial direction inside to hold the radial bearing RB2. The outer ring of the radial bearing RB2 is fitted in the internal circumferential surface of the stepped part of the annular member 32, and its inner ring is fitted on the outer circumferential surface of a first cylindrical part 40a, thereby enabling rotation of the input and the output shafts 30 and 40 relative to one another.

The thrust bearing TB1 is disposed between the opposite faces of the annular member 32 and an annular part 40b (described below) of the input shaft 30 and the output shaft 40 respectively. This thrust bearing TB1 is a member for enabling rotation of the input and the output shafts 30 and 40 relative to one another and inhibiting them from moving in the axial direction relative to one another.

As described above, the input shaft 30 enables the rotation of both the stator 202 (described below) and the output shaft 40 relative to one another.

The output shaft 40 of the present embodiment is an output hub, by which output torque transmitted from the output disk 18 of the continuously variable transmission mechanism 10 via the output-side cam mechanism 52 is output to outside.

This output shaft 40 includes: the first cylindrical part 40a with the rotation axis X as its central axis; a flange-like annular part 40b extended radially outside from the continuously variable transmission mechanism 10 side end (on the internal circumferential side) of the first cylindrical part 40a; and the second cylindrical part 40c extending from the outer circumferential side end of this annular part 40b toward the continuously variable transmission mechanism 10.

The first cylindrical part 40a is disposed radial direction inside the annular member 32 of the input shaft 30. Additionally, the annular part 40b is disposed closer to the continuously variable transmission mechanism 10 than the annular member 32, and the second cylindrical part 40c is disposed radial direction inside the cylindrical member 31 of the input shaft 30. The annular part 40b and second cylindrical part 40c are molded such that their respective outside diameters are substantially equal to the outside diameter of the output disk 18. Specifically, the annular part 40b and second cylindrical part 40c are molded such that their outside diameters are slightly smaller than the inside diameter of the cylindrical part 31a of the cylindrical member 31.

While the output torque of the continuously variable transmission mechanism 10 is transmitted to the second cylindrical part 40c via the output-side cam mechanism 52, the second cylindrical part 40c is able to transmit torque from a vehicle wheel 300 via the output-side cam mechanism 52.

This output shaft 40 is supported so as to freely rotate relative to the central shaft 21 via radial bearings RB3 and RB4 on the internal circumferential surface of the first cylindrical part 40a. The respective outer rings of the radial bearings RB3 and RB4 are fitted along the internal circumferential surface of the first cylindrical part 40a and their respective inner rings are fitted along the outer circumferential surface of the central shaft 21, thereby enabling rotation of the output shaft 40 and the central shaft 21 relative to one another. That is, the output shaft 40 is able to rotate around the rotation axis X relative to the central shaft 21 (i.e., a stator 202 in the case where continuously variable transmission is applied in the in-wheel motor 200).

In the continuously variable transmission 1 according to the present embodiment with the forgoing configuration, upon input of torque in the direction of normal rotation to the input shaft 30, the input shaft 30 rotates relative to the central shaft 21 according to the rotating direction of the torque. At this time, in this continuously variable transmission 1, the torque of the input shaft 30 is transmitted to the input disk 17 since the input shaft 30 and the input disk 17 are connected by the input-side cam mechanism 51 so as to rotate integrally in the direction of normal rotation. Further, at this time, axial thrust according to the torque of the input shaft 30 is generated in the input-side cam mechanism 51 and consequently the input disk 17 is pressed against the planetary balls 14.

Thus, in the continuously variable transmission 1, torque is transmitted to each of the planetary balls 14 from the input disk 17 by frictional force generated between the contact surface 17a of the input disk 17 and the external surfaces of the planetary balls 14. At the time, since each planetary ball 14 is supported by the corresponding support shaft 14a extending through its center and by the idler roller 13, the planetary ball 14 rotates around itself by virtue of torque transmitted from the input disk 17. As the planetary balls 14 rotate around themselves, the idler roller 13 rotates around the rotation axis X. The external surfaces of these planetary balls 14 rotating around themselves are also in contact with the contact surface 18a of the output disk 18. Therefore, since frictional force is generated in these contact portions as well, torque is transmitted to the output disk 18 from each of the planetary balls 14 by this frictional force. By virtue of torque from each of the planetary balls 14, the output disk 18 rotates relative to the central shaft 21 in the same direction as the input shaft 30 and the input disk 17.

The output shaft 40 is connected to the output disk 18 via the output-side cam mechanism 52. Therefore, in this continuously variable transmission 1, the torque of the output disk 18 is transmitted to the output shaft 40 since the output disk 18 and the output shaft 40 are connected by the output-side cam mechanism 52 so as to rotate integrally in the direction of normal rotation. Further, at this time, axial thrust according to the torque of the output disk 18 is generated in the output-side cam mechanism 52 and consequently the output disk 18 is pressed against the planetary balls 14.

As a result, the continuously variable transmission 1 according to the present embodiment is able to press the input and the output disks 17 and 18 against the planetary balls 14 during normal rotation of the input shaft 30. Thus, the continuously variable transmission 1 is able to generate contact pressure between the input disk 17 and the planetary balls 14 and between the output disk 18 and the planetary balls 14 and hence ensure transmission torque capacity corresponding to each contact pressure. Accordingly, in the continuously variable transmission 1, the torque of the input shaft 30 is adjusted to torque corresponding to transmission torque capacity, and this torque is transmitted to the output shaft 40 and then output to outside from this output shaft 40.

Torque transmitted to the output shaft 40 is, in other words, torque obtained by increasing or decreasing the torque of the input shaft 30 according to the transmission ratio of the continuously variable transmission mechanism 10. In the continuously variable transmission mechanism 10, the transmission ratio is determined according to tilting angle, at which each of the planetary balls 14 tilts together with the corresponding support shaft 14a. Therefore, in this continuously variable transmission 1, the idler plate 11 supporting the idler roller 13 such that the idler roller 13 rotates freely is moved by the shift mechanism 20 in the axial direction. Thereby the planetary balls 14 are tilted and the transmission ratio, which is the ratio of the number of rotations of the input shaft 30 to that of the output shaft 40, is continuously changed.

In the continuously variable transmission mechanism 10, if the radius of the input disk 17 and that of the output disk 18 are equal, the radius (the contact radius), from the rotation axis X, of the area where the contact surface 17a of the input disk 17 and the external surface of each planetary ball 14 are in contact with each other and the radius (contact radius), from the rotation axis X, of the area where the contact surface 18a of the output disk 18 is in contact with the external surface of each planetary ball 14 are equal to each other when the corresponding support shaft 14a is parallel to the central shaft 21. Consequently, a transmission ratio of "1" is yielded.

Figure 6:
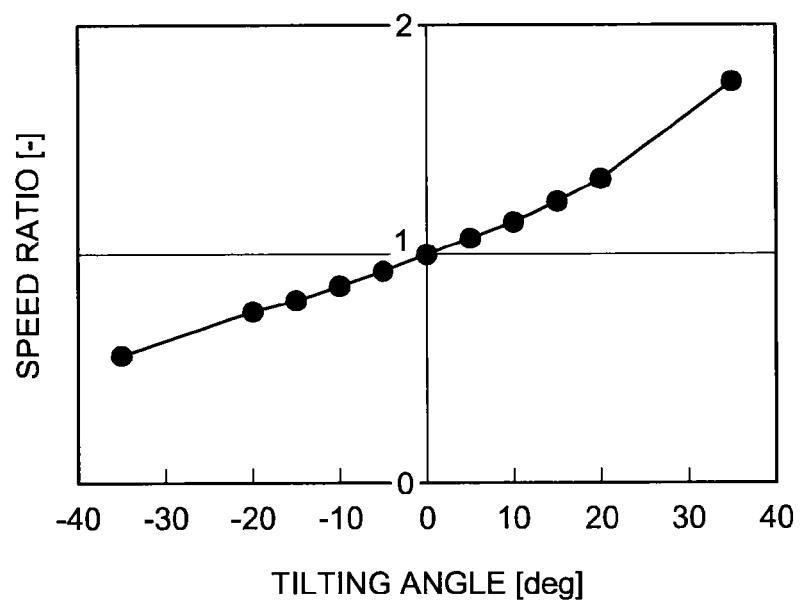
FIG. 6 is a graph illustrating the relation between the tilting angle of the planetary balls of the continuously variable transmission of the present embodiment and the transmission ratio (speed ratio).

In contrast, in the continuously variable transmission mechanism 10, when each support shaft 14a is tilting relative to the central shaft 21 accompanying the movement of the shift mechanism 20, either the contact radius of the input disk 17 and each planetary ball 14 or the contact radius of the output disk 18 and each planetary ball 14 increases and the other decreases according to the tilting angle of each planetary ball 14. Therefore, in the continuously variable transmission mechanism 10, the number of rotations of the output disk 18 with respect to the number of rotations of the input disk 17 changes with the changes of their contact radius. As a result, the transmission ratio, which is the ratio of the number of rotations of the one to the other, changes according to the tilting angle. For, example, FIG. 6 shows a graph obtained by plotting the numbers of rotations of the output disk 18 for the corresponding tilting angles in the case where the number of rotations of the input disk 17 is assumed to be "1".

Next will be described the case where the output shaft 40 rotates in reverse as when torque in the direction of reverse rotation is input to the output shaft 40.

In this case, the output shaft 40 rotates relative to the central shaft 21 according to the direction of rotation of torque. At the time, in the continuously variable transmission 1, since the output shaft 40 and the output disk 18 are connected by the output-side cam mechanism 52 so as to rotate integrally in the direction of reverse rotation, the torque of the output shaft 40 is transmitted to the output disk 18. Furthermore, at this time, axial thrust according to the torque of the output shaft 40 is generated in the output-side cam mechanism 52, and the output disk 18 is pressed against each of the planetary balls 14.

Thus, in the continuously variable transmission 1, torque is transmitted to each of the planetary balls 14 from the output disk 18 by frictional force generated between the contact surface 18*a* of the output disk 18 and the external surfaces of the planetary balls 14. At the time, since each planetary ball 14 rotates around itself by virtue of torque transmitted from the output disk 18, the idler roller 13 rotates around the rotation axis X as the planetary balls 14 rotate around themselves. The external surfaces of these planetary balls 14 rotating around themselves are also in contact with the contact surface 17*a* of the input disk 17. Therefore, torque is transmitted to the input disk 17 from each of the planetary balls 14 by the frictional force generated in the contact portion. By virtue of torque from each of the planetary balls 14, the input disk 17 rotates relative to the central shaft 21 in the same direction as the output shaft 40 and the output disk 18.

In the continuously variable transmission 1, torque of the input disk 17 is transmitted to the input shaft 30 since the input disk 17 and the input shaft 30 are connected by the input-side cam mechanism 51 so as to rotate integrally in the direction of reverse rotation. Furthermore, at this time, axial thrust according to torque of the input disk 17 is generated in the input-side cam mechanism 51 and consequently the input disk 17 is pressed against the planetary balls 14.

As a result, the continuously variable transmission 1 according to the present embodiment is able to press the input and the output disks 17 and 18 against the planetary balls 14 during reverse rotation of the output shaft 40. Thus, the continuously variable transmission 1 is able to generate contact pressure between the input disk 17 and the planetary balls 14 and between the output disk 18 and the planetary balls 14 and hence ensure transmission torque capacity corresponding to each contact pressure. Accordingly, in the continuously variable transmission 1, torque of the output shaft 40 is adjusted to torque corresponding to transmission torque capacity, and this torque is transmitted to the input shaft 30. Torque transmitted to the input shaft 30 is, in other words, torque obtained by increasing or decreasing, according to the transmission ratio of the continuously variable transmission mechanism 10, torque input to the output shaft 40.

Now, a detailed example of an application of the continuously variable transmission 1 is described. The detailed example may be applied in a rotary electrical machine of built-in transmission function type, which includes a function (a powering function) as an electric motor for converting electric energy into mechanical energy and outputting the mechanical energy, and a function (a regenerating function) as an electric generator for converting the mechanical energy into electric energy. As an example, a description below is given using an application in an electric motor at least part of which is disposed inside a vehicle wheel, namely a so-called in-wheel motor used in a vehicle, such as an HV (hybrid vehicle), EV (electric vehicle), or FCV (fuel cell vehicle), mainly as a drive source for running the vehicle.

The symbol 200 in FIG. 1 represents an in-wheel motor exemplified here. At least part of this in-wheel motor 200 is disposed inside a wheel 301 of a vehicle wheel 300 shown in FIG. 7 so as to able to rotate and drive the vehicle wheel 300. An in-wheel motor 200 is disposed for every vehicle wheel 300 used as a driving wheel in the vehicle.

This in-wheel motor 200 includes a motor generator section 201 as a rotary electrical machine body, and the continuously variable transmission 1, described above, as a transmission section. The motor generator section 201 and continuously variable transmission 1 are arranged such that their respective rotation centers coincide with the rotation center (rotation axis X shown in FIG. 1) of the corresponding vehicle wheel 300. Specifically, each of the elements of the in-wheel motor 200 are positioned such that the respective rotation centers of the stator 202 and the rotor 230 (described below) in the motor generator section 201, the rotation center of the continuously variable transmission mechanism 10, and the rotation center of the corresponding vehicle wheel 300 coincide with the rotation axis X.

With such an arrangement, the in-wheel motor 200 makes effective use of space in the vehicle, effective use of space remaining radial direction inside the wheel 301, lowering of the floor of the vehicle, elimination of the need for drive force transmission devices such as a drive shaft or differential gear, fine control of the number of rotations and torque for each vehicle wheel 300, vehicle position control, etc.

In this in-wheel motor 200, the motor generator section 201, as a whole, is formed in a cylindrical shape that has the same axis as the rotation axis X, and the continuously variable transmission 1 is arranged radial direction inside the motor generator section 201 (i.e., further inside than the internal circumferential surface of the motor generator section 201). In other words, on the radial direction outside, the continuously variable transmission 1 is covered by the motor generator section 201.

In this in-wheel motor 200, the motor generator section 201 has both a function (a powering function) as an electric motor configured such that power (torque) generated by conversion of electric energy into mechanical energy is output from the rotor 230 (described below) and used to rotate and drive the corresponding vehicle wheel 300; and a function (a regenerating function) as an electric generator configured such that when torque transmitted from the vehicle wheel 300 is input to the rotor 230, the input torque is converted from mechanical energy into electrical energy, thus enabling recovery of electrical energy. In this in-wheel motor 200, the continuously variable transmission 1 is configured such that its input shaft 30 serves as a rotor 230 for the motor generator section 201 and its output shaft 40 serves as an output shaft for the in-wheel motor 200 such that a transmission ratio, which is the ratio of the rotational speed of the input shaft 30 (rotor 230) to the rotational speed of the output shaft 40, can be changed steplessly. That is, this in-wheel motor 200 interposes the continuously variable transmission 1; thereby, regardless of the number of rotations of the corresponding vehicle wheel 300, the in-wheel motor 200 always drives the motor generator section 201 at a rate of rotation that is highly energy efficient. Furthermore, this in-wheel motor 200 incorporates the continuously variable transmission 1 inside the motor generator section 201 of the cylindrical shape, thereby making the device more compact.

Specifically, the motor generator section 201 is operable as an electric motor or electric generator, and is basically configured as a synchronous motor of permanent magnetic type. This motor generator section 201 includes a stator 202 as a stationary part and a rotor 230 as a rotating part. Each of the stator 202 and the rotor 230 is molded in a cylindrical shape with the rotation axis X as its central axis. In this motor generator section 201, the stator 202 is disposed so as to cover the radial direction outside of the rotor 230. That is, the rotor 230 is disposed radial direction inside the stator 202.

Upon being supplied with power, the stator 202 generates a specific electric field. This stator 202 has a stator coil 203 and an outer case 204. These compositional members form, as a whole, the shape of a cylinder with the rotation axis X as its central axis, whose axial end on the vehicle body side is closed and whose axial end on the wheel side is open.

The stator coil 203 is formed from a plurality of coils around a stator core (stator iron core). The coils are fixed on the internal circumferential surface of a cylindrical part 204a (described below) of the outer case 204 in a circumferential direction at substantially equal intervals (FIG. 2). The stator core may be one formed by arranging electromagnetic iron plates in layers or one formed from a compressed-powder magnetic core.

This stator coil 203 is electrically connected to a drive control device (not shown), which is a drive ECU (Electrical Control Unit) for the vehicle, via a three-phase cable or the like. For example, a command value for torque to be output by the in-wheel motor 200 is given to this drive control device by an integrated control device (not shown), which is an integrated ECU for the vehicle. The drive control device receiving the command generates controlling electric current required to output the torque, and supplies it to the stator coil 203 via the three-phase cable. At this time, power converted to a high voltage by an inverter or the like is supplied to the stator coil 203 from the drive control device.

The outer case 204 is a bottomed cylindrical member, uses the central shaft 21 of the continuously variable transmission 1 as a stator shaft 221, and has a cylindrical part 204a and the disk part 204b. The cylindrical part 204a is molded in a cylindrical shape that uses the rotation axis X as its central axis and has an inside diameter larger than the outside diameter of the rotor 230 (input shaft 30). This cylindrical part 204a is disposed so as to cover the outer circumferential surface of the rotor 230 with its internal circumferential surface and also hold the coils of the stator coil 203 between the outer circumferential surface of the rotor 230 and the internal circumferential surface of the cylindrical part 204a. On the other hand, the disk part 204b is provided for closing an opening formed in the vehicle-body side end of the cylindrical part 204a, and has a disk shape with the rotation axis X as its central axis. In this outer case 204, the cylindrical part 204a and the disk part 204b are integrated and thereby the disk part 204b serves as the bottom of the cylindrical part 204a. The disk part 204b of the outer case 204 is fitted on the stator shaft 221, which is a fixed shaft relative to the vehicle body. Here, the stator shaft 221 is identical in shape to the central shaft 21 of the continuously variable transmission 1, and includes a shift shaft 22 and so on forming a shift mechanism 20.

The outer case 204 forming this stator 202 is a holding member that holds the stator coil 203 and that is also used as an enclosing member for accommodating each of the parts of the in-wheel motor 200 so as to cover the radial direction outsides of these parts. That is, the rotor 230 of the motor generator section 201 and the continuously variable transmission 1 are accommodated in a cylindrical space portion defined radial direction inside the outer case 204. Formed on the surface of the disk part 204b, which surface is opposite the accommodated continuously variable transmission 1, is a stepped part for holding the axial and radial direction inside of the radial bearing RB1.

On the other hand, the rotor 230 is rotated and driven by receiving the magnetism of a magnetic field generated by the stator coil 203 of the stator 202, and generates mechanical power, that is, torque around the rotation axis X. The rotor 230 is disposed radial direction inside the outer case 204 forming the stator 202 and also radial direction inside the stator coil 203 (i.e., inside the stator 202). Specifically, the whole rotor 230 is inserted in the outer case 204 so as to be accommodated radial direction inside the stator coil 203.

This rotor 230 is identical in shape to the input shaft 30 of the continuously variable transmission 1. The rotor 230 has a cylindrical member 31 with an annular part 31b, and an annular member 32, which are similar to those of the continuously variable transmission 1. Where continuously variable transmission 1 is applied in the in-wheel motor 200, the outside diameter of the cylindrical part 31a of the cylindrical member 31 is set smaller than the inside diameter of the cylindrical part 204a of the outer case 204. Additionally, the length of the rotor 230 in its axial direction, specifically, the total of the length of the cylindrical member 31 in the axial direction and the thickness of the annular member 32 are set substantially equal to the length of the cylindrical part 204a of the outer case 204 in the axial direction.

Here, in this rotor 230, the cylindrical member 31 forms a rotor core (rotor iron core). Therefore, the cylindrical member 31 has a plurality of permanent magnets (not shown). The permanent magnets are provided at substantially equal intervals in a circumferential direction of the cylindrical member 31, and the polarities of each two permanent magnets adjacent to one another in a circumferential direction are set differently from each other. This rotor 230 may be an embedded magnetic type of permanent magnet rotor, in which a plurality of permanent magnets are embedded in the cylindrical member 31. Alternatively, it may be a surface magnet type of permanent magnet rotor, in which a plurality of permanent magnets are provided on the surface of the cylindrical member 31.

As with the input shaft 30, this rotor 230 is supported so as to be rotatable around the rotation axis X as its rotation center relative to the stator 202 and the output shaft 40 via the radial bearings RB1, RB2, and thrust bearing TB1.

Figure 7:
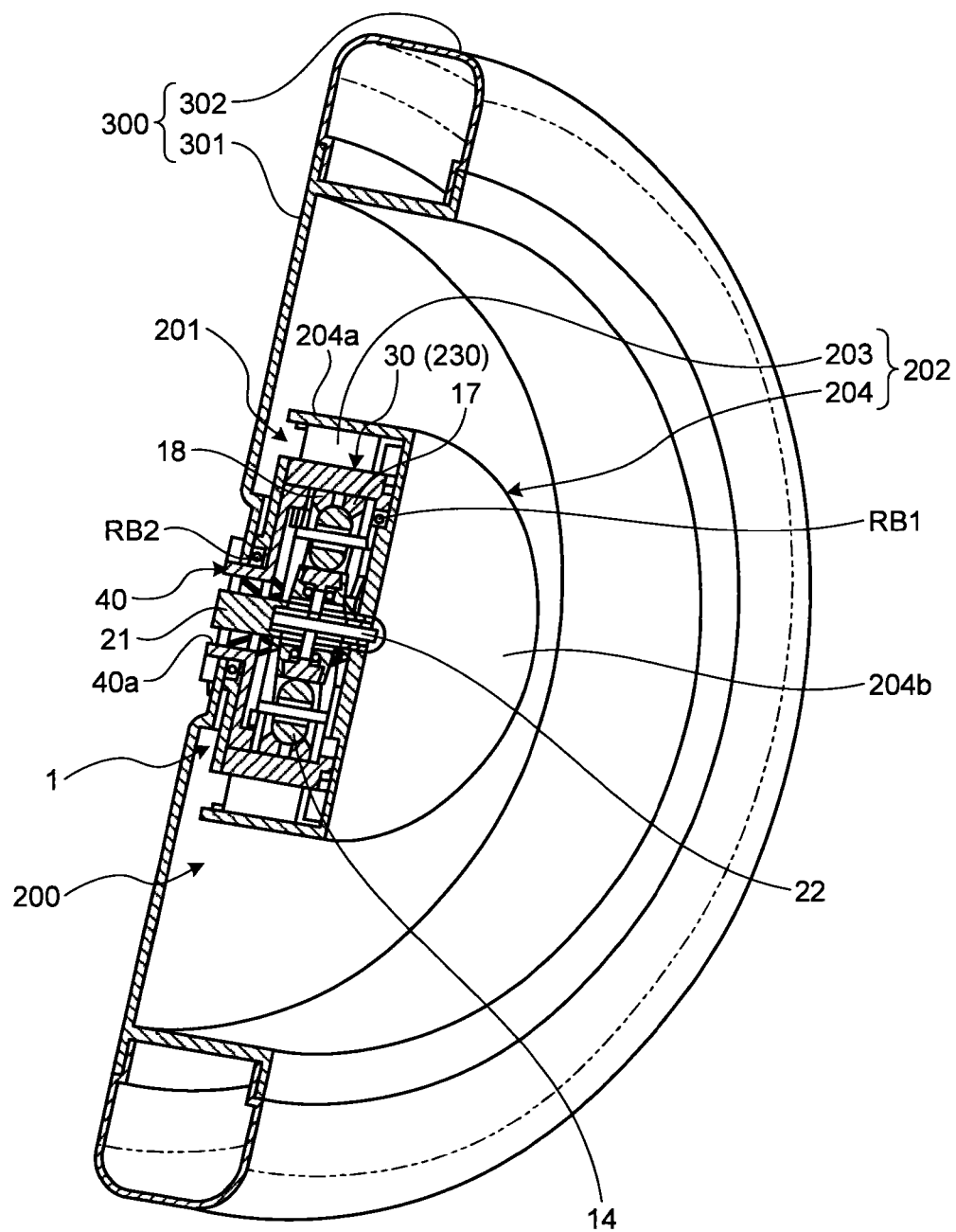
FIG. 7 is a perspective sectional view explaining an application example in which the continuously variable transmission according to the present embodiment is applied in an in-wheel motor, and illustrates an example of its installation in a vehicle wheel.

The in-wheel motor 200 thus configured is disposed such that the in-wheel motor 200 is located inside the wheel 301 of the vehicle wheel 300, as shown in FIG. 7, and the vehicle wheel 300 is made able to be rotated and driven as a driving wheel. The wheel 301 with a tire 302 fitted around it has a through-hole in its central part. The first cylindrical part 40a of the output shaft 40 is attached to the in-wheel motor 200 by its being fitted in the through-hole. The in-wheel motor 200 is fixed to the vehicle body, not shown. Specifically, this in-wheel motor 200 is attached to the vehicle body such that the disk part 204b of the outer case 204 is joined to an appropriate place of the vehicle body. With such a configuration, since the in-wheel motor 200 is able to have a wide area joining with the vehicle body, the fixing strength of the in-wheel motor 200 with respect to the vehicle body can be increased.

In the in-wheel motor 200, by causing controlled AC current to flow in the stator coil 203, the motor generator section 201 operates as an electric motor and consequently torque in the direction of normal rotation (normal motor torque) is generated in the rotor 230. Since the rotor 230 is supported by the radial bearings RB1, RB2, and thrust bearing TB1 so as to rotate freely, the rotor 230 is rotated in the direction of normal rotation by the generation of motor torque, and outputs motor output torque, which is its normal motor torque.

In the in-wheel motor 200, motor output torque of the rotor 230 is synonymous with torque of the input shaft 30 described above, and the continuously variable transmission 1 is actuated in the same manner as normal rotation of the input shaft 30 described above. Accordingly, the in-wheel motor 200 adjusts motor output torque generated by the rotor 230 of the motor generator section 201 to torque corresponding to the transmission torque capacity (transmission ratio) of the continuously variable transmission 1, and this torque is transmitted to the output wheel 40, thereby rotating and driving the vehicle wheel 300 with torque of the output shaft 40. Consequently, since driving force [N] is generated on the contact patch between the vehicle wheel 300 and the road surface, the vehicle can move forward.

On the other hand, during deceleration or the like of the vehicle, torque in the direction of reverse rotation is input to the output shaft 40 of the in-wheel motor 200. Consequently, the continuously variable transmission 1 is actuated in the same manner as reverse rotation of the output shaft 40 described above, torque of the output shaft 40 is adjusted to torque corresponding to transmission torque capacity (transmission ratio), and this torque is transmitted to the rotor 230. Torque transmitted to the rotor 230 acts in the direction of reverse rotation. Therefore, this in-wheel motor 200 operates the motor generator section 201 as an electric generator, thus converting torque of the rotor 230 into electric power and enabling storage of the electric power into a battery (not shown).

At this time, in the in-wheel motor 200, due to rotation resistance generated in the rotor 230, motor regeneration torque for braking rotation is generated in this rotor 230. That is, by virtue of motor regeneration torque, which is negative motor torque generated in the rotor 230, this in-wheel motor 200 is able to brake rotation of rotary members, such as the rotor 230, the input disk 17, the planetary ball 14, the output disk 18, and the output shaft 40. Accordingly, a vehicle incorporating this in-wheel motor 200 can be braked since braking force (negative driving force) is generated on the contact patch between the vehicle wheel 300 and the road surface. Specifically, the in-wheel motor 200 enables regeneration brake to be applied such that motor regeneration torque generated by power regeneration is caused to act on the vehicle wheel 300 and braking force, which is negative driving force, is applied to the vehicle.

Thus, in the in-wheel motor 200, torque generated in the rotor 230 by causing electric current to flow in the stator coil 203 is increased or decreased according to transmission ratio by the continuously variable transmission 1 able to alter a transmission ratio in a stepless manner (continuously); and torque after the increase or decrease can be output from the output shaft 40. Additionally, this in-wheel motor 200 can realize power regeneration and regeneration brake in a vehicle. Furthermore, in this in-wheel motor 200, the number of rotations of the rotor 230 can be set appropriately according to the transmission ratio of the continuously variable transmission 1 where the number of rotations of the output shaft 40 is constant. Therefore, in the in-wheel motor 200, the number of rotations of the rotor 230 can be set to the number of rotations for high energy efficiency, which can be determined from, for example, a characteristic diagram. Specifically, in this in-wheel motor 200, although the rotor 230 is rotated by torque generated by causing electric current to flow in the stator coil 203, the transmission ratio of the continuously variable transmission 1 disposed between the rotor 230 and the output shaft 40 is appropriately changed at this time, thereby setting the rotor 230 to the number of rotations for high energy efficiency. Additionally, the in-wheel motor 200 is configured such that the motor generator section 201 for generating torque by causing electric current to flow in it and the continuously variable transmission 1 able to alter in a stepless manner a transmission ratio to increase or decrease the torque can be disposed concentrically and these are accommodated in the single outer case 204, thus making the entire configuration more compact.

Incidentally, the continuously variable transmission 1 has various sliding portions. For example, such sliding portions are the contact surface 17a of an input disk 17, the contact surface 18a of the output disk 18, the contact area between the external surface of the idler roller 13 and the external surface of each planetary ball 14, and the contact area between the contact surface 11b of the idler plate 11 and the contact surface 15a of each tilting arm 15. In order to ensure durability, some of the sliding portions may use coolant or the like to restrain heat generation caused by friction and, in order to ensure smooth movement, others may interpose lubricant or the like.

The continuously variable transmission 1 according to the present embodiment is provided with: a cooling device able to cool sliding portions and various portions that may be affected by these sliding portions, and a lubricating device for smooth operation of the sliding portions. As such a lubricating device, one already known in the technical field for this type of continuously variable transmission 1 may be used. For example, a configuration may be employed where an appropriate quantity of lubricant liquid may be applied to a suitable place.

On the other hand, the cooling device for the continuously variable transmission 1 is configured such that coolant is caused to reflow within the carrier 16. The cooling device includes: a coolant supply part, such as a motor pump, for supplying coolant; a coolant reflow passage formed in at least one of the disk parts 16a of the carrier 16; a coolant supply passage connecting the coolant supply part and coolant reflow passage; and a coolant discharge passage for discharging coolant used for cooling. Thereby, sliding portions and portions that may be affected by the heat generation of the sliding portions can be cooled, thus improving the durability of the continuously variable transmission 1.

The coolant reflow passage is a hole defined in a circumferential direction in the disk part 16a around the rotation axis X. At least one cooling reflow passage is formed in the disk part 16a, for example, on the outer hull side. Alternatively, the coolant reflow passage may be an annular hole, which is a circle formed in a circumferential direction, or may be an arc hole formed in a circumferential direction. Here, the number of, positions, and shape/shapes of coolant reflow passages are set so as not make the strength of the carrier 16 insufficient. With regard to other passages as well, such as the coolant supply passage, the number of, positions, and shape/shapes of each are set such that their strengths are taken into account. Where a coolant reflow passage is provided for each of the two disk parts 16a, a communication passage, by which the coolant reflow passages communicate with each other, may be defined in a connection shaft 16b connecting the disk parts 16a.

As for the continuously variable transmission 1 itself, a coolant supply passage and a coolant discharge passage may be formed in a member, such as the central shaft 21, which neither moves nor rotates with respect to the carrier 16.

As coolant, a cooling liquid (e.g., traction oil) serving as a lubricant liquid as well for sliding portions may be used. In this case, it is preferable that the coolant supply part be shared with a lubricant liquid supply part, such as the motor pump of the lubricating device.

In this continuously variable transmission 1, as a transmission ratio becomes larger than "1" or smaller than "1", heat generation resulting from spin loss increases. For this reason, the cooling device for the continuously variable transmission 1 is configured such that as the transmission ratio becomes larger than "1" or smaller than "1", and the flow rate of coolant increases; in other words, as a transmission ratio approaches to "1", the flow rate of coolant decreases. Thereby, the continuously variable transmission 1 is able to improve cooling performance in an area where heat generation due to spin loss is significant, thus improving durability. Additionally, the continuously variable transmission 1 is able to adjust the flow rate of coolant based on transmission ratio information that has been obtained by the drive control device. Accordingly, the need for a detecting device (e.g., a temperature sensor), estimating device, or the like for the temperature of the continuously variable transmission 1 is obviated. Accordingly, while an increase in the cost of such devices is restrained, cooling performance and durability of the continuously variable transmission 1 can be improved.

For example, here, the configuration may be such that the coolant supply part is able to be driven and controlled by a control device such as a drive control device, and the coolant supply part may be controlled so as to increase coolant supply as the transmission ratio becomes larger than "1" or smaller than "1". In this case, the coolant supply part and control device serve together as a cooling performance adjusting device that adjusts the cooling performance of the cooling device of the continuously variable transmission 1, or that improves the cooling performance of the cooling device of the continuously variable transmission 1 as the transmission ratio becomes larger than "1" or smaller than "1". This configuration is useful where the coolant supply part is not shared with the lubricant liquid supply part of the lubricating device or vice versa. Additionally, the continuously variable transmission 1 may be configured such that a flow rate adjusting device, such as a flow rate adjusting valve, is disposed in a certain point in a coolant passage such as the coolant supply passage, and the flow rate adjusting device is driven and controlled by a control device such as the drive control device, and the flow rate adjusting device may be controlled in order to increase the flow rate of the coolant as the transmission ratio becomes larger than "1" or smaller than "1". In this case, the flow rate adjusting device and control device serve together as a cooling performance adjusting device that adjusts the cooling performance of the cooling device of the continuously variable transmission 1. This configuration is useful where the coolant supply part is shared with the lubricant liquid supply part of the lubricating device, or vice versa.

With regard to the in-wheel motor 200 again, this in-wheel motor 200 is able to obtain the same effect by provision of such a cooling device configured for the continuously variable transmission 1. However, in the in-wheel motor 200, the motor generator section 201 is also susceptible to heat generation. Therefore, in order to ensure the durability of the motor generator section 201, it is necessary to cool the motor generator section 201 as well.

The cooling device of the motor generator section 201 is configured so as to reflow coolant within the outer case 204. This cooling device includes: a coolant supply part, such as a motor pump, for supplying coolant; a coolant reflow passage formed in the cylindrical part 204a of the outer case 204; a coolant supply passage connecting the coolant supply part and coolant reflow passage; and a coolant discharge passage for discharging coolant used for cooling. Thereby, the heat generating portions of the rotor 230 and so on can be cooled, thus improving the durability of the motor generator section 201.

The coolant reflow passage is a hole defined in a circumferential direction in the cylindrical part 204a around the rotation axis X. At least one cooling reflow passage is formed in the cylindrical part 204a. Alternatively, the coolant reflow passage may be an annular hole, which is a circle formed in a circumferential direction, or may be an arc hole formed in a circumferential direction. Here, the number of, positions, and shape/shapes of coolant reflow passages are set so as not to make the strength of the outer case 204 insufficient. With regard to other passages as well, such as the coolant supply passage, the number of, positions, and shape/shapes of each are set such that their strengths are taken into account.

On the other hand, the coolant supply passage and coolant discharge passage may be formed, for example, in the outer case 204 itself or stator shaft 221, which neither moves nor rotates relative to the outer case 204.

As coolant, as described above, a cooling liquid (e.g., traction oil) serving as a lubricant liquid as well for sliding portions of the continuously variable transmission 1 and so on may be used. In this case, it is preferable that the coolant supply part be shared with the lubricant liquid supply part of the lubricating device of the continuously variable transmission 1.

In the foregoing in-wheel motor 200, both the continuously variable transmission 1 and the motor generator section 201 are provided with individual cooling devices. However, this configuration is not desirable in terms of cost, mounting space, etc., because although there are some components that could be sharable between them, such as the coolant supply part, these components are not actually shared between them. Therefore, a description is given below of an example of a cooling device 250 for the in-wheel motor 200 in which the configurations of the respective cooling devices of the continuously variable transmission 1 and the motor generator section 201 have been modified. The cooling device 250 of this in-wheel motor 200 not only improves its durability by virtue of an improvement in the cooling performance of the motor generator section 201, but also reduces its cost and size, compared to the case where cooling devices are individually provided for them.

As shown in FIGS. 1 and 2, the cooling device 250 includes: a coolant supply part 251, such as a motor pump, for supplying coolant; at least one first coolant reflow passage 252 formed in at least one of the disk parts 16a of the carrier 16; and at least one second coolant reflow passage 253 formed in the cylindrical part 204a of the outer case 204.

The coolant supply part 251 may be specifically provided for this cooling device 250. Where a cooling liquid (e.g., traction oil) also serving as a lubricant for sliding portions of the continuously variable transmission 1 and so on is used as coolant, the coolant supply part 251 can be shared with the lubricant liquid supply part of the lubricating device of the continuously variable transmission 1. It is assumed that the first coolant reflow passage 252 is the same as the coolant reflow passage of the cooling device of the continuously variable transmission 1 described above. Also, it is assumed that the second coolant reflow passage 253 is the same as the coolant reflow passage of the cooling device of the motor generator section 201 described above.

Further, this cooling device 250 includes: at least one first coolant supply passage 254 formed in the disk part 204b of the outer case 204 and communicating with the first coolant reflow passage 252, thereby connecting the first coolant reflow passage 252 and the coolant supply part 251; at least one second coolant supply passage 255 formed in the cylindrical part 204a and the disk part 204b of the outer case 204 and communicating with the second coolant reflow passage 253, thereby connecting the second coolant reflow passage 253 and the coolant supply part 251; at least one first coolant discharge passage 256 formed in the disk part 204b of the outer case 204 and communicating with the first coolant reflow passage 252, thereby discharging coolant that has already reflowed in the first coolant reflow passage 252; and at least one second coolant discharge passage 257 formed in the cylindrical part 204a and the disk part 204b of the outer case 204 and communicating with the second coolant reflow passage 253, thereby discharging coolant that has already reflowed in the second coolant reflow passage 253.

Specifically, coolant is supplied to the first coolant reflow passage 252 from the first coolant supply passage 254, and coolant used for cooling is discharged from this first coolant reflow passage 252 via the first coolant discharge passage 256. Also, coolant is supplied to the second coolant reflow passage 253 from the second coolant supply passage 255, and coolant that has already been used is discharged from this second coolant reflow passage 253 via the second coolant discharge passage 257. Coolant discharged from the first coolant discharge passage 256 or second coolant discharge passage 257 may be returned to the coolant supply part 251 after being sent to a coolant storage part such as a reservoir tank, not shown, or may be directly returned to the coolant supply part 251.

Where only one first coolant supply passage 254, only one second coolant supply passage 255, only one coolant discharge passage 256, and only one second discharge passage 257 are provided, the first and second coolant supply passages 254 and 255 and the coolant discharge passages 256 and 257 may be formed in locations so as to be arranged symmetrically around the rotation axis X. Thus, coolant that has already been supplied can be caused to reflow through the entire first and second coolant reflow passages 252 and 253. In particular, the first and second coolant reflow passages 252 and 253 of annular shape or approximately annular arc shape can cool the continuously variable transmission 1 and the motor generator section 201 uniformly.

Here, the first coolant reflow passage 252 is formed in each of the two disk parts 16a. Therefore, first and second communication passages 258 and 259, by which the first coolant reflow passages 252 communicate with each other, are provided in at least two corresponding connection shafts 16b connecting the disk parts 16a. The first communication passage 258 is used to supply coolant from the first coolant reflow passage 252 of the vehicle body side disk part 16a to the first coolant reflow passage 252 of the wheel side disk part 16a, and communicates with the first coolant supply passage 254. That is, coolant is supplied to the first coolant reflow passage 252 of the wheel side disk part 16a via the first coolant supply passage 254 and first communication passage 258. The second communication passage 259 is configured such that coolant that has already been used for cooling in the first coolant reflow passage 252 of the wheel side disk part 16a is supplied to the first coolant reflow passage 252 of the vehicle body side disk part 16a. This second communication passage 259 communicates with the first coolant discharge passage 256. That is, coolant that has already been used for cooling in the first coolant reflow passage 252 of the wheel side disk part 16a is discharged via the second communication passage 259 and the first coolant discharge passage 256.

Figure 8:
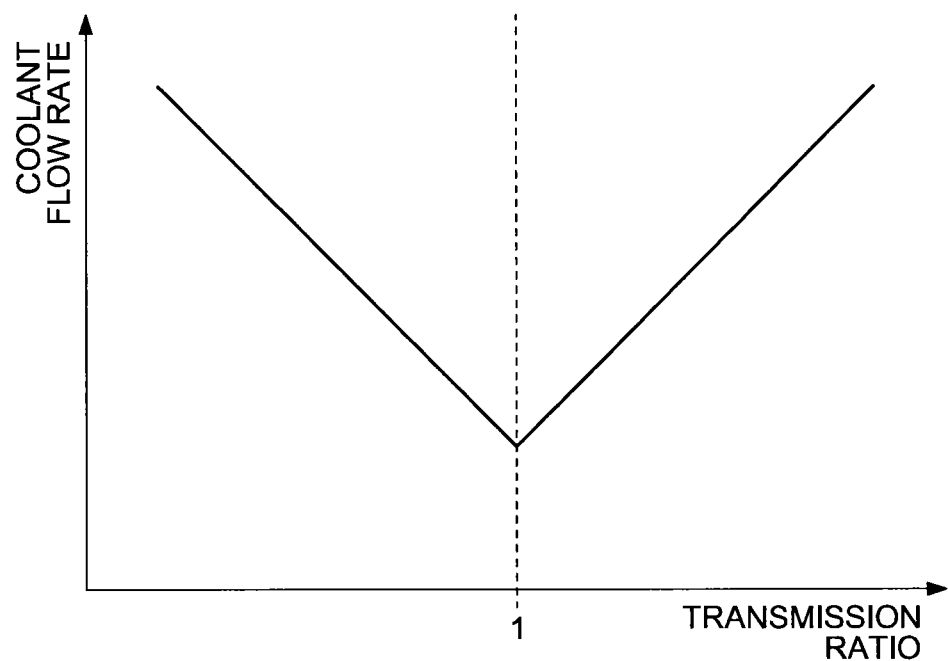
FIG. 8 is a graph illustrating the relation between the transmission ratio and the coolant flow rate.

As described in the cooling device for the continuously variable transmission 1 as well, the cooling device 250 of the in-wheel motor 200 also increases the flow rate of coolant to the carrier 16, as shown in, for example, FIG. 8, as a transmission ratio becomes larger than "1" or smaller than "1".

Therefore, for example, if the coolant supply part 251 is not shared with the lubricant liquid supply part of the lubricating device of the continuously variable transmission 1 or vice versa, as described above, the coolant supply part 251 may be driven and controlled by a control device, such as a drive control device, in order to increase the quantity of coolant supplied as a transmission ratio becomes larger than "1" or smaller than "1". In this case, the coolant supply part 251 and control device serve as cooling performance adjusting devices that adjust the cooling performance of the continuously variable transmission 1 (continuously variable transmission mechanism 10), to be specific, that enhance the cooling performance of the continuously variable transmission 1 (continuously variable transmission mechanism 10) as a transmission ratio becomes larger than "1" or smaller than "1". Thus, the in-wheel motor 200 is able to enhance the cooling performance of the continuously variable transmission 1 in the area where heat generation due to spin loss is high, and also the cooling performance of the motor generator section 201, thus improving the durability of both the continuously variable transmission 1 and the motor generator section 201. This in-wheel motor 200 is also able to adjust the flow rate of coolant based on transmission ratio information held by the drive control device, as described above, thus making it possible to improve the cooling performance of the continuously variable transmission 1 (the durability of the continuously variable transmission 1) while restraining cost increase.

Figure 9:
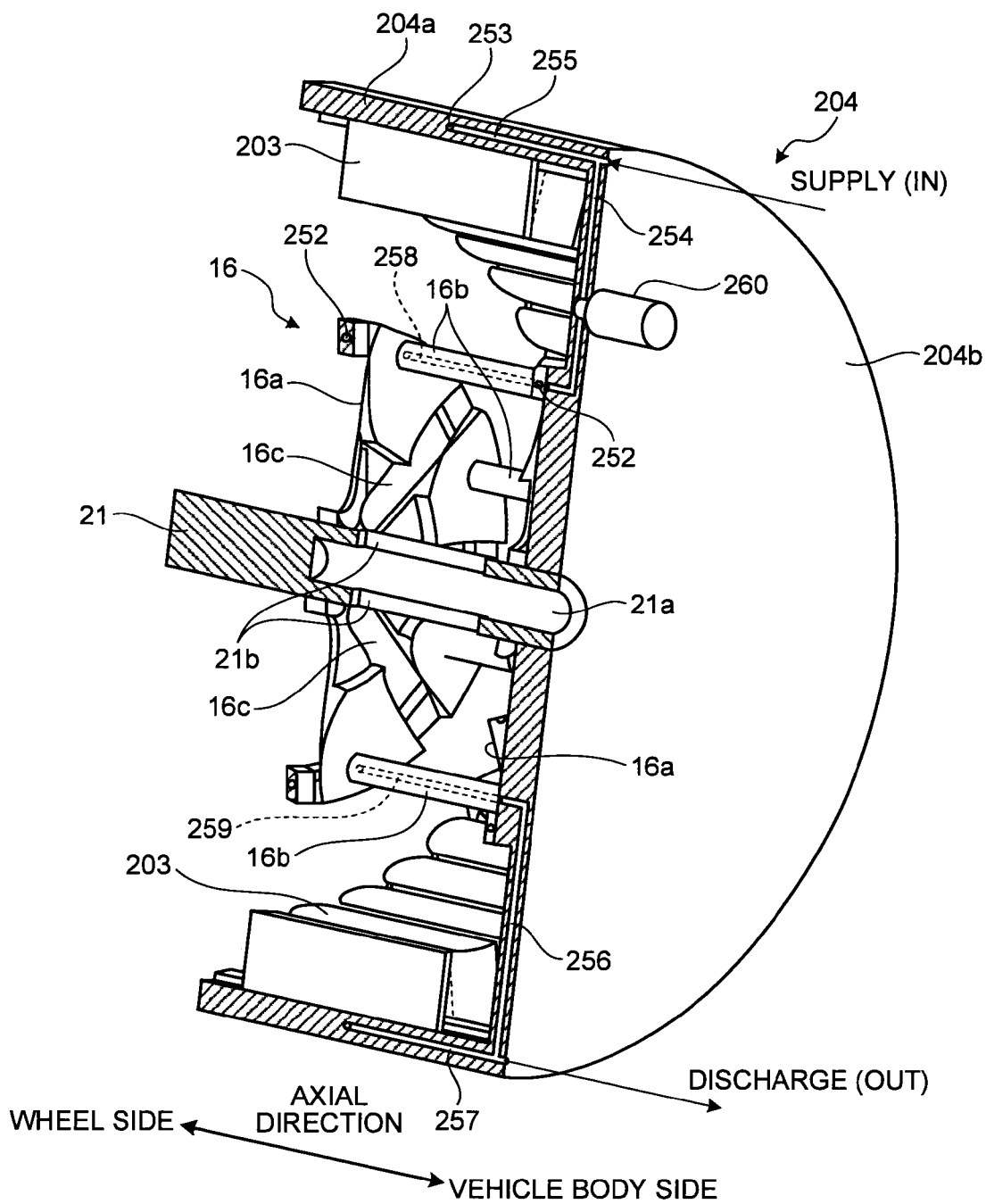
FIG. 9 is a perspective sectional view illustrating an application example in which the continuously variable transmission according to the present embodiment is applied in an in-wheel motor, and also illustrates a continuously variable transmission that includes a coolant flow rate adjusting device.

In this case, the flow rate adjustment of coolant by drive control exerted by the coolant supply part 251 also changes in the same manner the flow rate of coolant flowing in the outer case 204. At this time, the cooling performance of the motor generator section 201 may be degraded due to the adjustment. Therefore, the configuration is made such that in order that the continuously variable transmission 1 exhibit appropriate cooling effect corresponding to a transmission ratio without changing the cooling performance of the motor generator section 201, only the flow rate of coolant to the carrier 16 is adjusted. Specifically, a flow rate adjusting device 260 such as a flow rate adjusting valve, as shown in FIG. 9, able to adjust the flow rate of coolant to the carrier 16, is provided; and the flow rate adjusting device 260 is driven and controlled by a control device such as a drive control device. For example, the flow rate adjusting device 260 is disposed on the first coolant supply passage 254 that conveys coolant to the first coolant reflow passage 252. Additionally, the control device is configured to control the flow rate adjusting device 260 in order to increase the flow rate of coolant as a transmission ratio becomes larger than "1" or smaller than "1". In this case, the flow rate adjusting device 260 and control device serve as coolant performance adjusting devices that adjust the cooling performance of the continuously variable transmission 1 (continuously variable transmission mechanism 10), specifically, that enhance the cooling performance of the continuously variable transmission (continuously variable transmission mechanism 10) as a transmission ratio becomes larger than "1" or smaller than "1". Thus, without degrading the cooling performance of the motor generator section 201, the in-wheel motor 200 can improve the cooling performance of the continuously variable transmission 1 in an area where heat generation due to spin loss is high. Accordingly, while the durability of the motor generator section 201 is further improved, the durability of the continuously variable transmission 1 can also be improved.

Industrial Applicability

As described above, the continuously variable transmission according to the present invention, which includes an input member, output member, rotary members sandwiched between them and which steplessly changes a transmission ratio between the input and output members by tilting the rotary members, is useful as technology suitable for cooling continuously variable transmission.

Reference Sign List

- 1 CONTINUOUSLY VARIABLE TRANSMISSION
- 10 CONTINUOUSLY VARIABLE TRANSMISSION MECHANISM
- 11 IDLER PLATE
- 13 IDLER ROLLER
- 14 PLANETARY BALLS
- 15 TILTING ARM
- 16 CARRIER
- 16a DISK PART
- 16b CONNECTION SHAFT
- 17 INPUT DISK
- 18 OUTPUT DISK
- 20 SHIFT MECHANISM
- 21 CENTRAL SHAFT
- 30 INPUT SHAFT
- 40 OUTPUT SHAFT
- 51 INPUT-SIDE CAM MECHANISM
- 52 OUTPUT-SIDE CAM MECHANISM
- 200 IN-WHEEL MOTOR
- 201 MOTOR GENERATOR SECTION
- 202 STATOR
- 203 STATOR COIL
- 204 OUTER CASE
- 204a CYLINDRICAL PART
- 204b DISK PART
- 221 STATOR SHAFT
- 230 ROTOR
- 250 COOLING DEVICE
- 251 COOLANT SUPPLY PART
- 252 FIRST COOLANT REFLOW PASSAGE
- 253 SECOND COOLANT REFLOW PASSAGE
- 254 FIRST COOLANT SUPPLY PASSAGE
- 255 SECOND COOLANT SUPPLY PASSAGE
- 256 FIRST COOLANT DISCHARGE PASSAGE
- 257 SECOND COOLANT DISCHARGE PASSAGE
- 258 FIRST COMMUNICATION PASSAGE
- 259 SECOND COMMUNICATION PASSAGE
- 260 FLOW RAGE ADJUSTING DEVICE
- x ROTATION AXIS

The invention claimed is:

1. A continuously variable transmission including a continuously variable transmission mechanism that includes an input member, an output member, and rotary members sandwiched between them and that steplessly changes a transmission ratio between the input member and the output member by tilting the rotary members, the continuously variable transmission comprising:
a cooling device configured to cool the continuously variable transmission mechanism by supplying coolant thereto in such a manner that flow rate of the coolant is increased as the transmission ratio becomes larger than 1 or smaller than 1,
wherein the continuously variable transmission mechanism is incorporated in a rotary electrical machine, and wherein the cooling device also cools the rotary electrical machine.

2. The continuously variable transmission according to claim 1, wherein the cooling device cools the continuously variable transmission mechanism by supplying the coolant to an inside of a carrier holding the rotary members.

3. The continuously variable transmission according to claim 1, wherein the cooling device cools the continuously variable transmission mechanism by supplying the coolant to an inside of a carrier holding the rotary members.

4. The continuously variable transmission according to claim 1, wherein the cooling device cools the continuously variable transmission mechanism by supplying the coolant to an inside of a carrier holding the rotary members.

5. A continuously variable transmission including a continuously variable transmission mechanism that includes an input member, an output member, and rotary members sandwiched between them and that steplessly changes a transmission ratio between the input member and the output member by tilting the rotary members, the continuously variable transmission comprising:
a cooling device configured to cool the continuously variable transmission mechanism by supplying coolant thereto; and
a cooling performance adjusting device configured to increase flow rate of the coolant as the transmission ratio becomes larger than 1 or smaller than 1,
wherein the cooling device also cools a rotary electrical machine incorporating the continuously variable transmission mechanism, and the cooling performance adjusting device is provided between the continuously variable transmission mechanism and the rotary electrical machine.

6. The continuously variable transmission according to claim 5, wherein the cooling performance adjusting device includes a flow rate adjusting device configured to adjust flow rate of the coolant.

7. The continuously variable transmission according to claim 6, wherein the cooling device cools the continuously variable transmission mechanism by supplying the coolant to an inside of a carrier holding the rotary members.

8. The continuously variable transmission according to claim 5, wherein the cooling device cools the continuously variable transmission mechanism by supplying the coolant to an inside of a carrier holding the rotary members.

9. The continuously variable transmission according to claim 5, wherein the cooling device cools the continuously variable transmission mechanism by supplying the coolant to an inside of a carrier holding the rotary members.

10. A continuously variable transmission including as a continuously variable transmission mechanism a traction planetary gear mechanism, the continuously variable transmission comprising:
a cooling device configured to cool the continuously variable transmission mechanism by supplying coolant thereto in such a manner that flow rate of the coolant is increased as the transmission ratio becomes larger than 1 or smaller than 1,
wherein the continuously variable transmission mechanism is incorporated in a rotary electrical machine, and wherein the cooling device also cools the rotary electrical machine.

* * * * *